(12) United States Patent
Kaplan et al.

(10) Patent No.: US 6,401,034 B1
(45) Date of Patent: Jun. 4, 2002

(54) METHOD AND SYSTEM FOR FINDING INTERMEDIATE DESTINATIONS WITH A NAVIGATION SYSTEM

(75) Inventors: Lawrence M. Kaplan, Northbrook, IL (US); John L. Hanson, Citrus Heights, CA (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/388,661

(22) Filed: Sep. 2, 1999

(51) Int. Cl.[7] ..................... G06F 165/00; G01C 21/00
(52) U.S. Cl. ..................... 701/209; 701/204; 340/988
(58) Field of Search ....................... 701/201, 204, 701/209, 210, 216, 217; 340/988, 990, 995; 342/357, 457

(56) References Cited

U.S. PATENT DOCUMENTS

| | | | | |
|---|---|---|---|---|
| 5,608,635 A | * | 3/1997 | Tamai ..................... 364/449.3 |
| 5,787,383 A | | 7/1998 | Moroto et al. |
| 5,802,492 A | * | 9/1998 | Delorme et al. ............. 701/200 |
| 5,906,654 A | * | 5/1999 | Stato ........................... 701/210 |
| 5,911,773 A | * | 6/1999 | Mutsuga et al. ............ 701/200 |
| 5,924,075 A | * | 7/1999 | Kanemitsu ..................... 705/6 |
| 5,926,118 A | | 7/1999 | Hayashida et al. ......... 340/995 |
| 5,931,888 A | * | 8/1999 | Hiyokawa .................... 701/208 |
| 5,948,040 A | * | 9/1999 | Delorme et al. ............ 701/201 |
| 5,948,041 A | | 9/1999 | Abo et al. ................... 701/207 |
| 5,978,733 A | | 11/1999 | Deshimaru et al. ......... 701/209 |
| 6,009,403 A | | 12/1999 | Sato ............................... 705/6 |

* cited by examiner

*Primary Examiner*—Tan Nguyen
*Assistant Examiner*—Dalena Tran
(74) *Attorney, Agent, or Firm*—Frank J. Kozak; Jon D. Shutter

(57) ABSTRACT

A navigation system includes a feature that allows a user to specify a type of point of interest at which the user wishes to make an intermediate stop while on route to a final destination. The feature identifies for the user one point of interest of the specified type at which an intermediate stop can be made while on route to the final destination, wherein a route to the final destination that includes an intermediate stop at the one point of interest takes less time than routes to the final destination that make an intermediate stop at other points of interest of the specified type.

18 Claims, 16 Drawing Sheets

(PARALLEL TO SOLUTION ROUTE)

(HEADING ELLIPTICAL PARABOLOID)

(HEADING ELLIPTICAL PARABOLOID)

(TEARDROP)

(KEYHOLE)

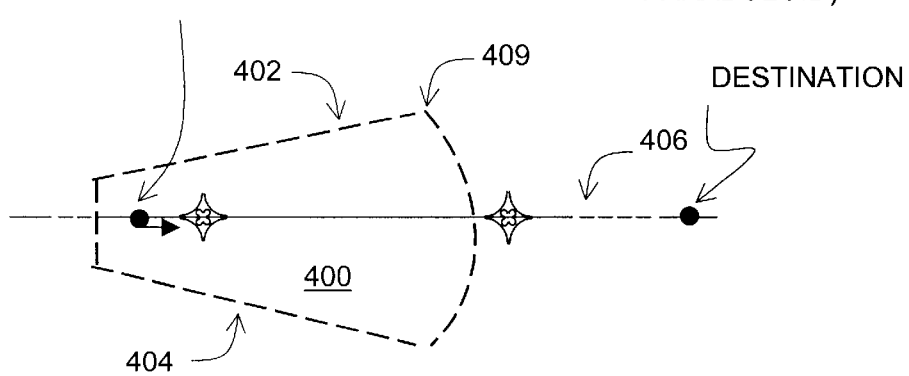
FIG. 18 (HEADING ELLIPTICAL PARABOLOID)
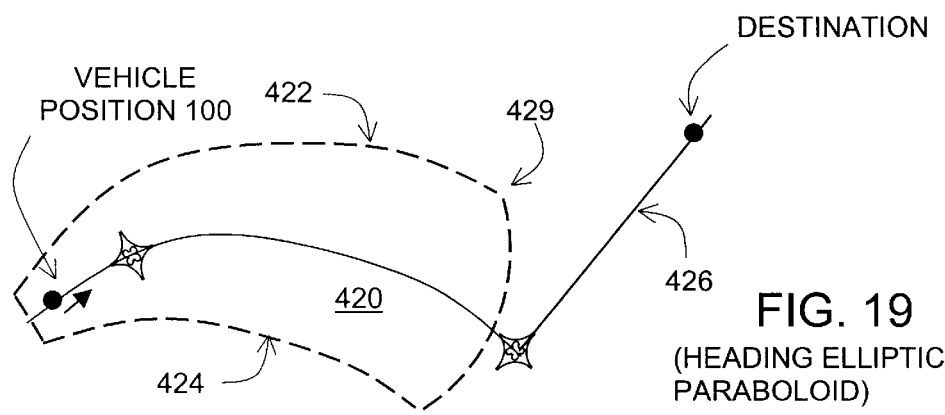
FIG. 19 (HEADING ELLIPTICAL PARABOLOID)
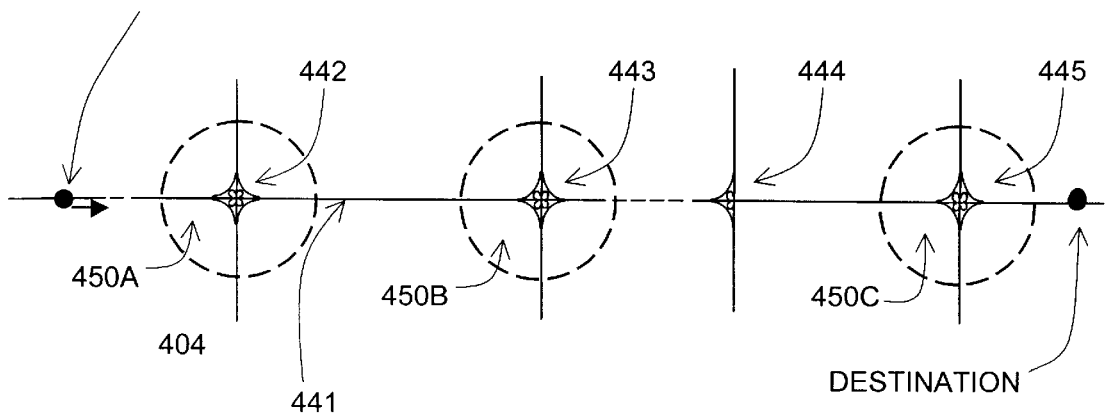
FIG. 20 (QUICK ON/OFF CONSTRAINED)

METHOD AND SYSTEM FOR FINDING INTERMEDIATE DESTINATIONS WITH A NAVIGATION SYSTEM

BACKGROUND OF THE INVENTION

The present invention relates to in-vehicle navigation systems and more particularly the present invention relates to a navigation system feature that facilitates making intermediate stops on route to a final destination.

In-vehicle navigation systems are available that provide end users (such as drivers of the vehicles in which the in-vehicle navigation systems are installed) with various navigating functions and features. For example, some in-vehicle navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for improvements. One area in which there is room for improvement relates to providing guidance for routes that include one or more intermediate stops along the way to a final destination. One example of a situation in which this type of route occurs is when a navigation system user wants to stop at a restaurant along the way to a final destination. Some navigation systems can identify all the restaurants of a particular type within a specified distance (e.g., 5 km) of the vehicle's current location. However, this information is not necessarily useful because these restaurants may be in the opposite direction from the final destination toward which the vehicle is traveling. Navigation systems may be able to identify all the restaurants of a particular type along a calculated route to the final destination. However, some of these restaurants may be difficult to reach from the calculated route and may require a significant amount of time to detour off the calculated route to reach.

Accordingly, there continues to be a need for a feature in a navigation system that provides guidance about making intermediate stops along the way to a final destination.

SUMMARY OF THE INVENTION

To address these and other objectives, the present invention comprises a feature for a navigation system that allows a user to specify a type of point of interest at which the user wishes to make an intermediate stop while on route to a final destination. The feature identifies for the user one point of interest of the specified type at which an intermediate stop can be made while on route to the final destination, wherein a route to the final destination that includes an intermediate stop at the one point of interest takes less time than routes to the final destination that make an intermediate stop at other points of interest of the specified type.

According to another aspect, a feature in a navigation system provides information to the user of the navigation system about making an intermediate stop while on route to a final destination. The location of a point of interest at which the intermediate stop is made is selected to optimize any of various criteria relative to a route to the final destination that includes an intermediate stop at the point of interest. These criteria may include minimizing travel on roads other than controlled access roads, minimizing tolls, and minimizing overall distance, among other.

For purposes of this disclosure, a "navigation system" is understood to mean a navigation system installed in a vehicle (i.e., an in-vehicle navigation system). A "navigation system" is also understood to mean any software application installed on a computer platform that provides navigation-related features and uses geographic data, including applications that are installed on personal computers, networks, portable electronic devices, and so on.

BRIEF DESCRIPTION OF THE DRAWINGS

FIGS. 18 and 19 are illustrations of alternative search geometry patterns used with the embodiment of FIG. 17.

FIG. 20 is an illustration of a search geometry pattern used with an alternative embodiment.

DETAILED DESCRIPTION OF THE PRESENTLY PREFERRED EMBODIMENTS

I. Overview of Navigation System

Figure 1:
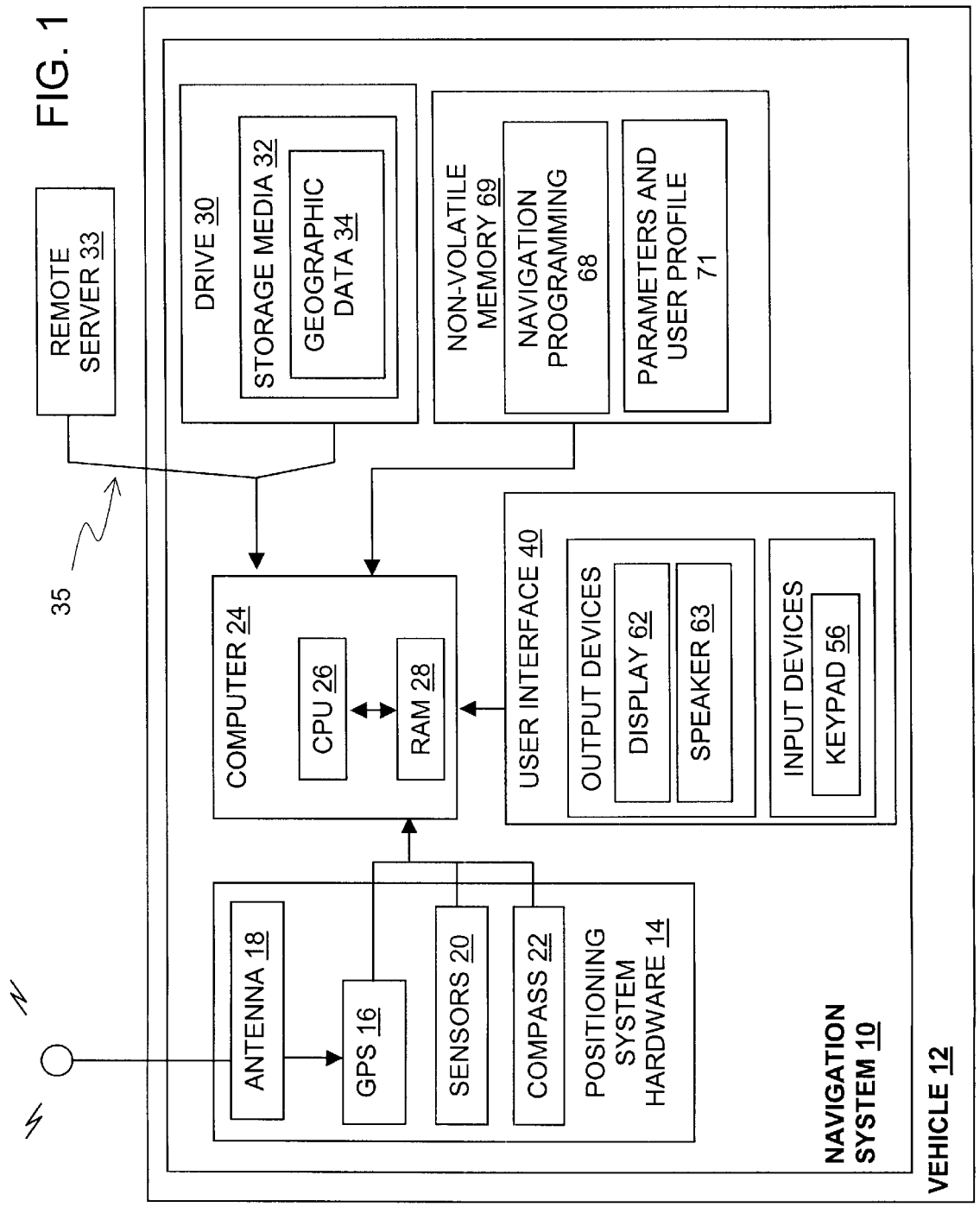
FIG. 1 is a block diagram showing components of an exemplary navigation system used in conjunction with a first embodiment of a route guidance feature that provides route guidance for intermediate stops.

Referring to FIG. 1, there is a diagram illustrating an exemplary configuration of a navigation system 10. The navigation system 10 is a combination of hardware and software components. In one embodiment, the navigation system 10 is located in an automobile 12. The navigation system 10 includes appropriate positioning system hardware 14 which in an exemplary embodiment may include a GPS system 16 and/or other equipment, such as an antenna 18, sensors 20 coupled to sense the vehicle speed, a compass 22 to sense the vehicle direction, and possibly other equipment, by which the vehicle position can be determined by dead reckoning. In addition, the navigation system 10 includes appropriate computer hardware 24, including a processor 26 and memory 28 as well as other appropriate equipment. The processor 26 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

In order to provide navigation features to an end user, the navigation system 10 uses geographic data 34. The geographic data 34 includes information about one or more geographic regions or coverage areas. The geographic data 34 may be stored on a data storage medium 32 installed in a drive 30 in the vehicle 12 or alternatively, the geographic data 34 may be stored at a remote location 33 and made available to the navigation system 10 in the vehicle 12 through a wireless communication system 35 which may be part of the navigation system 10. In another alternative, a portion of the geographic data 34 may be stored on a medium 32 in the vehicle 12 and a portion of the geographic data 34 may be stored in the remote location 33 and made available to the navigation system 10 in the vehicle 12 over the wireless communication system 35 from the remote location 33.

In one embodiment, the storage medium 32 is a CD-ROM disk. In another alternative embodiment, the storage medium 32 may be a PCMCIA card in which case the drive 30 would be substituted with a PCMCIA slot. Various other storage media may be used, including fixed or hard disks, DVD disks or other currently available storage media, as well as storage media that may be developed in the future.

The geographic data 34 may be contained in one or more computer-readable data files or databases. The geographic data 34 include data records that represent roads and intersections in or related to a specific geographic region or area. These data records include information about the represented roads, such as one-way traffic restrictions, turn restrictions, street addresses, alternative routes, etc. The geographic data 34 also include data entities that represent points of interest, such as hotels, restaurants, museums, stadiums, offices, automobile dealerships, auto repair shops, etc.

In one embodiment, the geographic data are developed and provided by Navigation Technologies Corporation of Rosemont, Ill., however it is understood that data developed and provided by other entities may also be suitable for use with the inventive subject matter disclosed herein.

The navigation system 10 also includes a user interface 40 coupled to the computer 24. The user interface 40 includes appropriate means for receiving instructions and input from a user as well as means for providing information back to the user. For example, the input means may include an input keypad 56 and possibly other input hardware and software, such as a microphone, voice recognition software, and so on, through which the driver (or passenger) can request navigation-related information and services, and possibly other kinds of information and services. The output means of the user interface 40 may include output hardware and software, such as a display screen 62, speakers 63, speech synthesis software, etc., through which the driver or passengers can be provided with information from the navigation system 10.

All of the components described above may be conventional (or other than conventional) and the manufacture and use of these components are known to those of skill in the art.

II. The Navigation Programming

As stated above, the navigation system 10 includes software components. The software components of the navigation system 10 include navigation programming 68. The navigation programming 68 may include separate applications (or subprograms). These applications provide various navigation-related features to the user of the navigation system 10. These features may include route calculation, route guidance (wherein detailed directions are provided for reaching a desired destination), map display, vehicle positioning (e.g., map matching), and so on. The navigation applications may be written in a suitable computer programming language such as C, C++, Java, Visual Basic, etc.

The navigation programming 68 may be stored in a storage device 69 (or ROM) or alternatively, the navigation programming 68 may be provided on the same storage device or medium as the geographic data 34. During a typical use of the navigation system 10 of FIG. 1, some or all the applications included in the navigation programming 68 are loaded from the ROM 69 into the memory 28 associated with the processor 26. The computer 24 receives input from the user interface 40. The input may include a request for navigation-related information. Information is obtained from the positioning system hardware 14 indicating a position of the vehicle 12. The information from the positioning system hardware 14 may be used by the navigation programming 68 that is run on the processor 26 to determine the location, direction, speed, etc., of the navigation system 10, and hence the vehicle. The navigation programming 68 uses the geographic data 34 stored on the storage medium 32, possibly in conjunction with the outputs from the positioning system hardware 14, to provide various navigation-related functions and features. The features provided by these navigation applications are provided to the user (e.g., the vehicle driver) by means of the user interface 40.

The storage device 69 may include additional data. For example, the storage device 69 may be used to store operating parameters or user profile data 71. The user profile data 71 may include various kinds of personal preferences related to the use of the navigation system. For example, the user profile data 71 may include what kinds of roads are preferred, e.g., expressways. The user profile data 71 may also include which chains of restaurants, gas stations, hotels, etc., are preferred. The user profile data 71 may also include what kinds of roads to avoid (e.g., tollways) or what business chains to avoid. The user profile data 71 may be entered by the user using a menu screen provided by the user interface 40.

Figure 2:
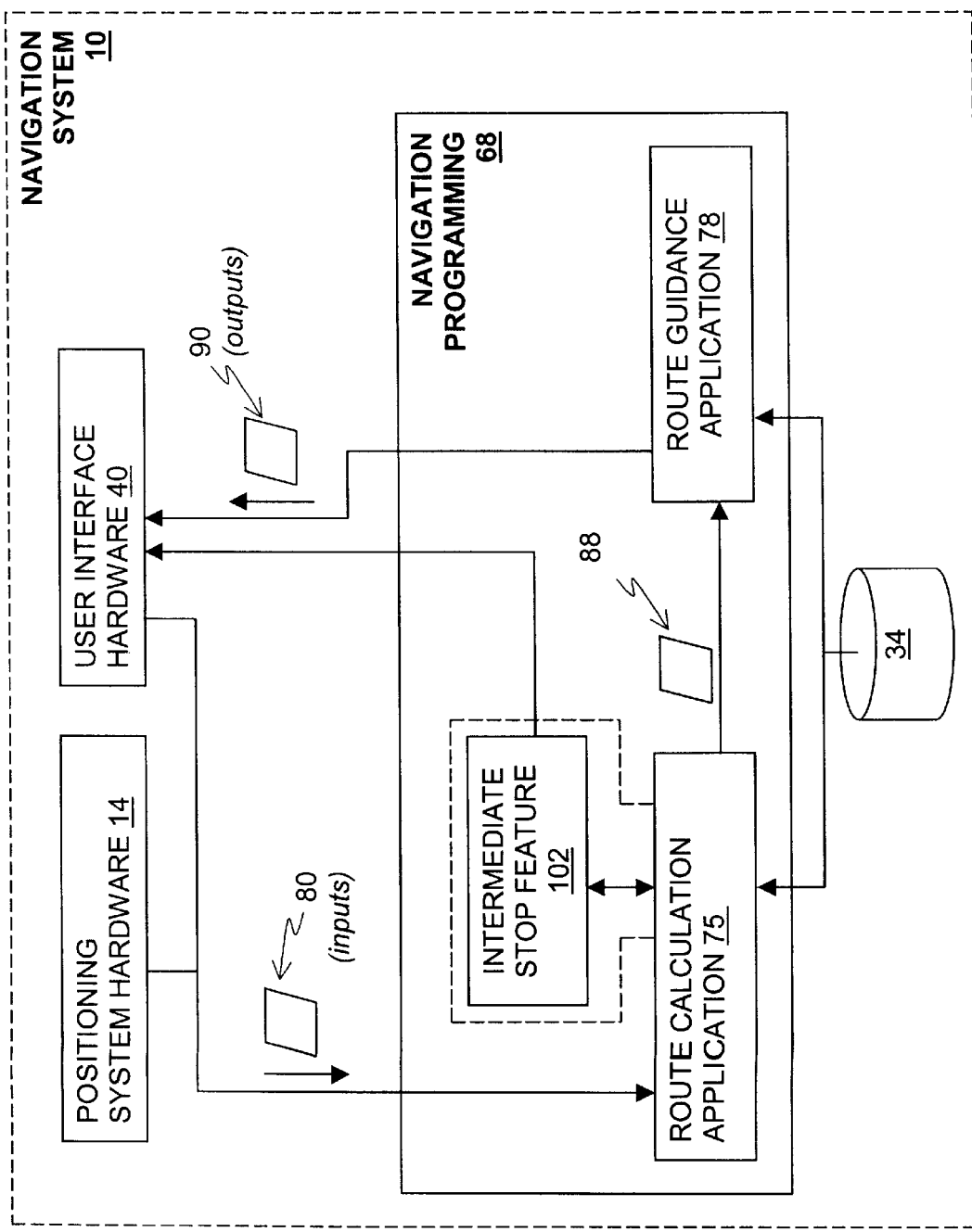
FIG. 2 is a block diagram showing portions of the navigation application programming in FIG. 1.

FIG. 2 is block diagram representing a portion of the navigation programming 68. The portion of the navigation programming 68 shown in FIG. 2 includes a route calculation application 75 and a route guidance application 78. (The navigation programming 68 may include other applications in addition to these.) The route calculation application 75 calculates a route from an origin location to a destination location. The route guidance application 78 provides instructions to the vehicle driver for following the route calculated by the route calculation application 75. In FIG. 2, the route calculation application 75 receives inputs 80. The inputs 80 are derived from the positioning system hardware 14 and/or user interface 40.

The inputs 80 include identifications of an origin and destination. Using these inputs 80, the route calculation application 75 determines a route from the origin to the destination. The route calculation application 75 may use any of various means or algorithms for this purpose. For example, the route calculation application 75 may use either the A* algorithm or the Dykstra algorithm. Methods for determining routes are disclosed in Ser. No. 08/893,201, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.)

Regardless of the method used, the objective of the route calculation application 75 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 75 may be designed to optimize the solution route to meet one or more predetermined criteria. Such criteria may include the least travel time, the shortest distance, the fewest turns, etc. If the method used by the route calculation application 75 is designed to find a solution route that is optimized for one or more criteria, then the solution route also ideally meets these one or more criteria. After the route calculation application 75 has found a solution route, an output 88 is provided to the route guidance application 78.

Using the data in the output 88 of the route calculation application 75, the route guidance application 78 forms instructions 90 to be provided to the vehicle driver to follow the calculated route to the destination. The instructions 90 may be provided to the vehicle driver via the user interface 40. The instructions 90 may be provided as audible instructions using the speaker 63 of the user interface 40. The instructions may be provided visually as text, symbols, maps, graphical displays, and so on, using the display screen 62 of the user interface 40.

III. Route Guidance for Intermediate Stops at Points of Interest

A. First Embodiment

Figure 3:
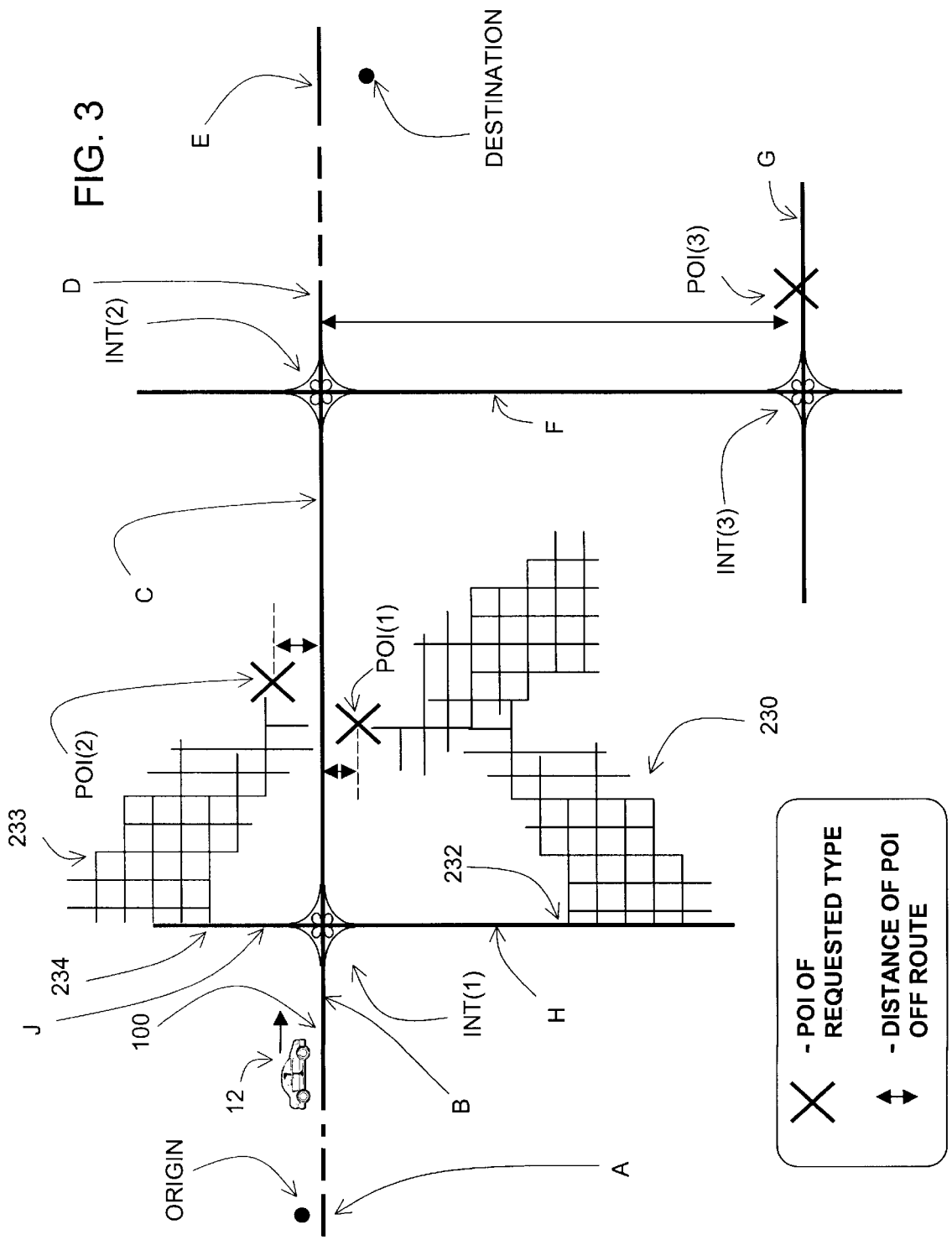
FIG. 3 is a map used to describe operation of the first embodiment of the navigation system feature that provides route guidance for intermediate stops.

A first embodiment of the navigation system feature that provides guidance for making an intermediate stop at a location (or point of interest) of a specified type is described in connection with FIG. 3. In FIG. 3, the vehicle 12 with the navigation system 10 is shown traveling on the road segment labeled "B". The road segment "B" is part of a controlled access road (e.g., an expressway or a tollway). The vehicle 12 is at a first position 100 along the road segment "B" approaching an interchange labeled "INT(1)."

The vehicle 12 is following a solution route calculated by the in-vehicle navigation system 10 from an origin to a destination. (The origin and the destination are labeled as such in FIG. 3). The solution route calculated by the navigation system 10 includes the road segments labeled "A" ... "B", "C", "D" ... and "E". As the vehicle 12 is being driven along the solution route, the in-vehicle navigation system 10 installed in the vehicle 12 may be providing the vehicle driver with instructions or other types of route guidance for following the solution route.

When the vehicle is at the position labeled 100, the driver wishes to make an intermediate stop along the way to the destination. The intermediate stop may be for any purpose. For example, the driver may wish to stop at a restaurant to eat. Alternatively, the driver may want to stop at a gas station, a hotel, a grocery, a pharmacy, a florist, a hardware store, etc.

Although the driver may wish to make an intermediate stop for any of the above purposes, there are several navigation-related factors about which the driver may desire information before deciding whether to make an intermediate stop. For example, the driver may decide not to make the stop if the desired type of stop is located far off the solution route. Alternatively, the driver may decide not to make the stop if detouring to the desired type of stop would take too much time. Accordingly, when deciding whether to make an intermediate stop while on route to final destination, the driver may want more than a mere identification of points of interest of a specified category at which a possible intermediate stop can be made.

An embodiment of the disclosed navigation system provides a navigation-related feature that assists a driver in deciding whether to make an intermediate stop. If the driver decides to make an intermediate stop, the navigation system guides the driver to the selected intermediate stop and then to the final destination. This navigation-related feature is provided by an intermediate stop routine 102 (shown in FIG. 2), which is included in the navigation system 10. According to one embodiment, the intermediate stop routine 102 is part of the route calculation application 75. Alternatively, the intermediate stop routine 102 may be part of the route guidance application 78. In another alternative, the intermediate stop routine 102 may be a standalone program or application included in the navigation programming 68.

According to a present embodiment, the navigation system user interacts with the navigation system to access the features provided by the intermediate stop routine 102. The user interface 40 of the navigation system may be used for this purpose. The user may enter the appropriate commands using the input keypad 56 in conjunction with menus shown on the display 62. Alternatively, the navigation system user may use voice commands, if supported by the navigation system.

FIGS. 4–9 show the display 62 of the navigation system 10 with examples of menu screens that present selections to the user from which the user can choose a type of point of interest at which to make an intermediate stop. These menu screens are generated by programming in the intermediate stop routine 102. The menu screens depicted in FIGS. 4–9 are intended to be examples and it should be understood that various other kinds of menus and/or screens may be used.

Figure 4:
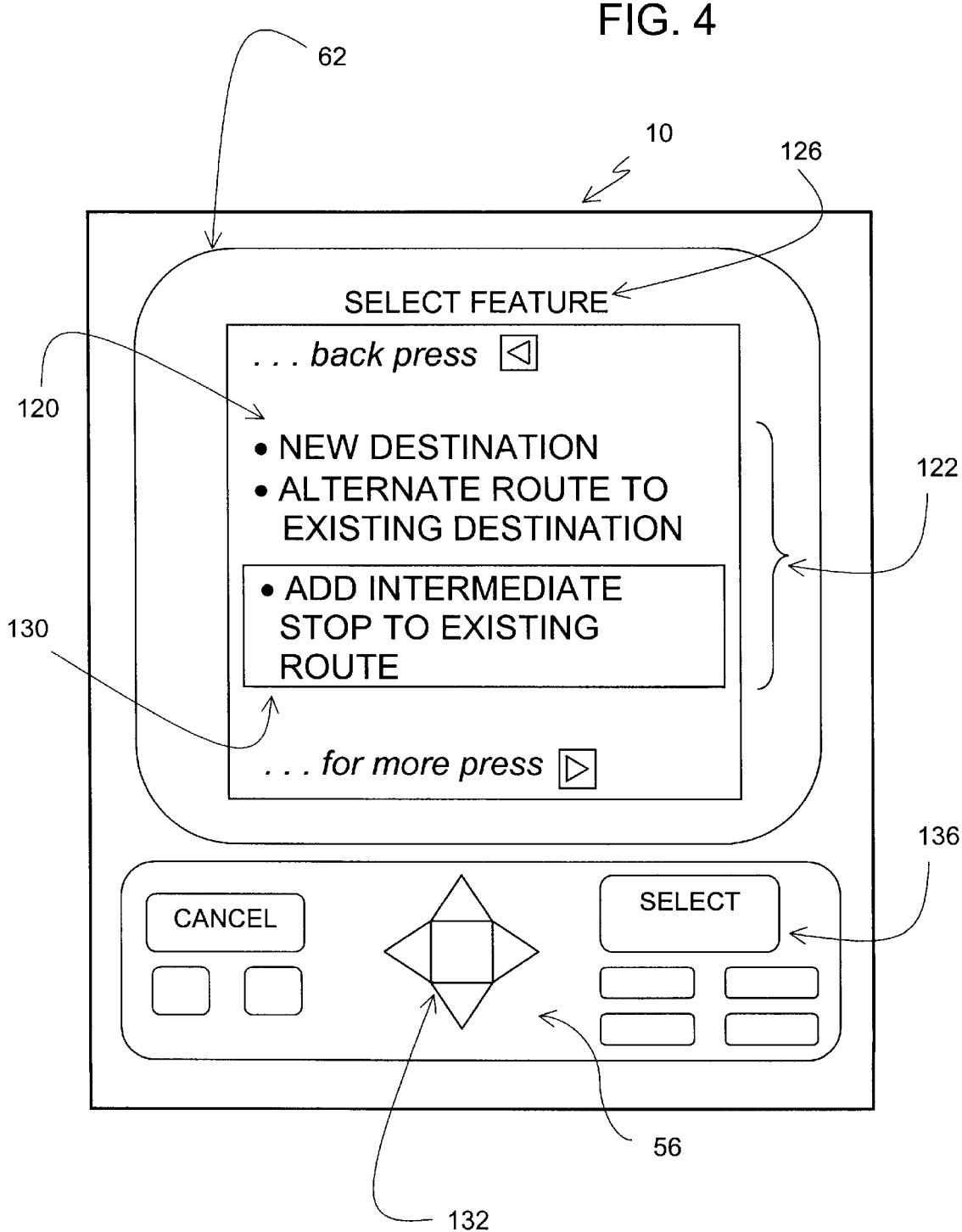
FIGS. 4–9 show menus on the display of the navigation system of FIG. 1, wherein the menus are used in connection with the operation of the route guidance feature for determining intermediate stops.

FIG. 4 shows a menu 120 on the display 62 of the navigation system 10. The menu 120 presents a plurality of available features 122. The user is prompted by a message 126 to choose one of the available features 122. One of the features is highlighted with an outlining box 130. The user can manually press a toggle 132 on the keypad 56 of the user interface 40 to move the outlining box 130 up or down in order to change the feature highlighted with the outlining box 130. When the outlining box 130 is on the feature that the user wants to choose, the user presses another key to select the highlighted feature. For example, the user may press a "SELECT" key 136. In FIG. 4, the feature labeled "ADD INTERMEDIATE STOP TO EXISTING ROUTE" is highlighted with the outlining box 130 and the user can select this item by pressing the "SELECT" key 136. (Other features that are available on this menu 120 include calculating a new route to a new destination and calculating alternative routes to the existing destination.)

Figure 5:
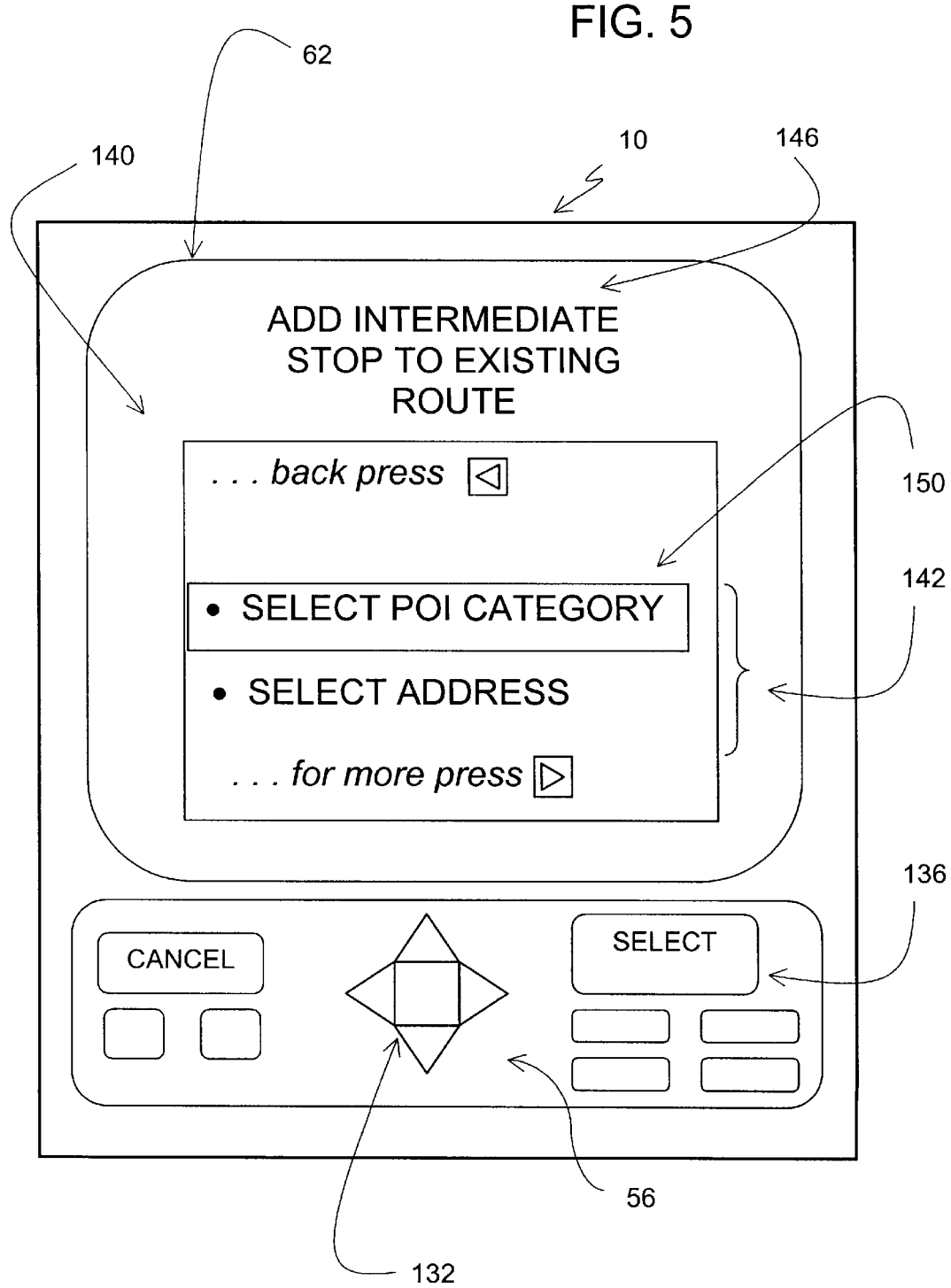

When the user selects the feature that provides for adding an intermediate stop to the existing route, another menu screen is presented. An example of this menu screen is shown in FIG. 5. In FIG. 5, a menu 140 on the display 62 presents a plurality of selections 142 from which the user can choose one. The user is prompted by a message 146 to make a selection. One of the selections is highlighted with an outlining box 150. In the embodiment of FIG. 5, the item "SELECT POI CATEGORY" is highlighted with the outlining box 150 and the user can select this item by pressing the "SELECT" key 136. (Alternatively, from this menu 140, the user can select a street address at which to make an intermediate stop.)

Figure 6:
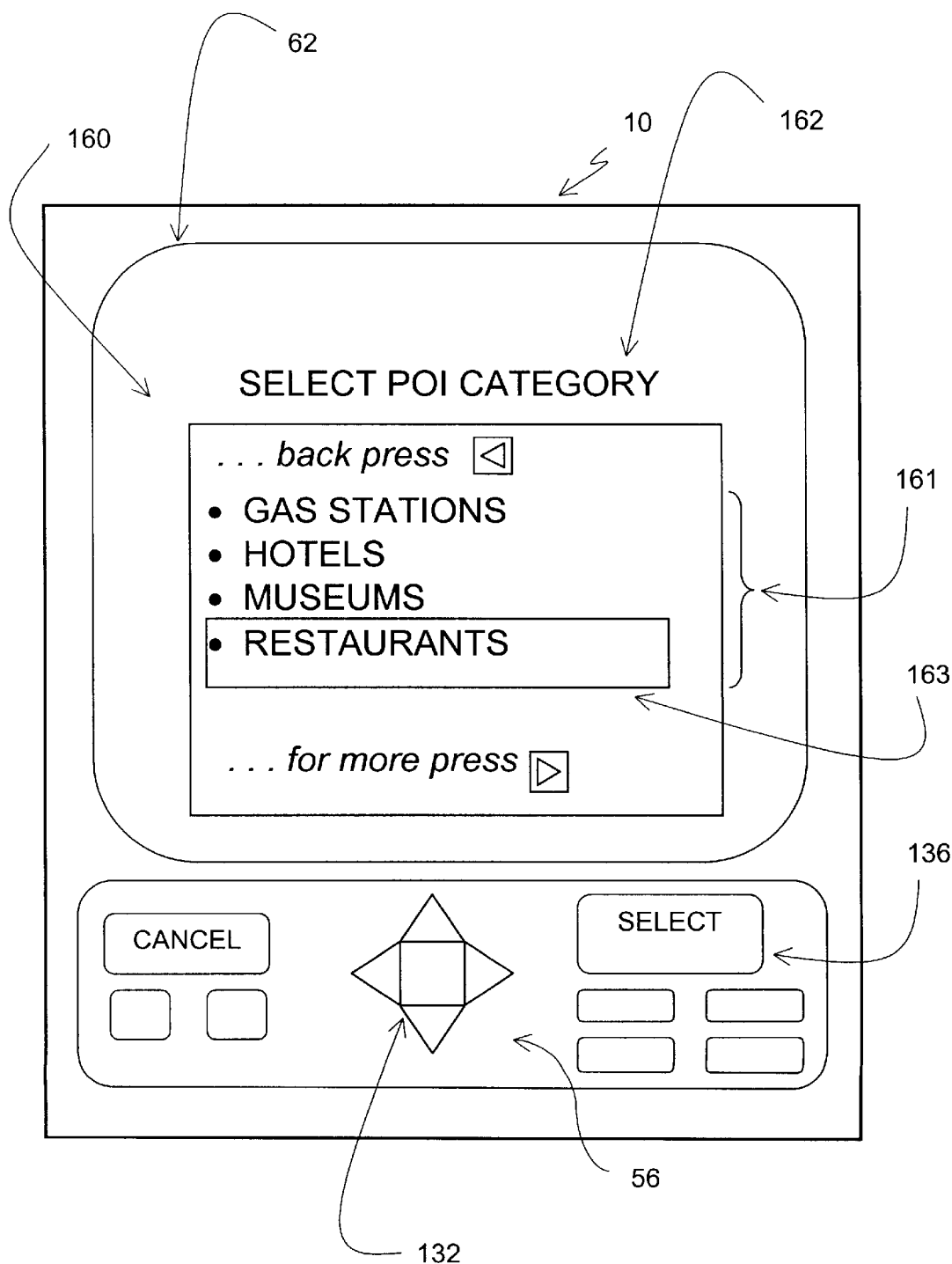

When the user chooses to select a point of interest category, a menu screen like the one on FIG. 6 is presented. In FIG. 6, a menu 160 on the display 62 presents a plurality of categories 161 from which the user can choose one. The categories 161 include the different types of points of interest that are included in the database of geographic data 34 used by the navigation system 10. These categories may include restaurants, hotels, gas stations, etc. The user is prompted by a message 162 to choose one of the categories. One of the categories is highlighted with an outlining box 163. In the embodiment of FIG. 6, the "RESTAURANTS" category is highlighted with the outlining box 163 and the user can select this category by pressing the "SELECT" key 136.

Figure 7:
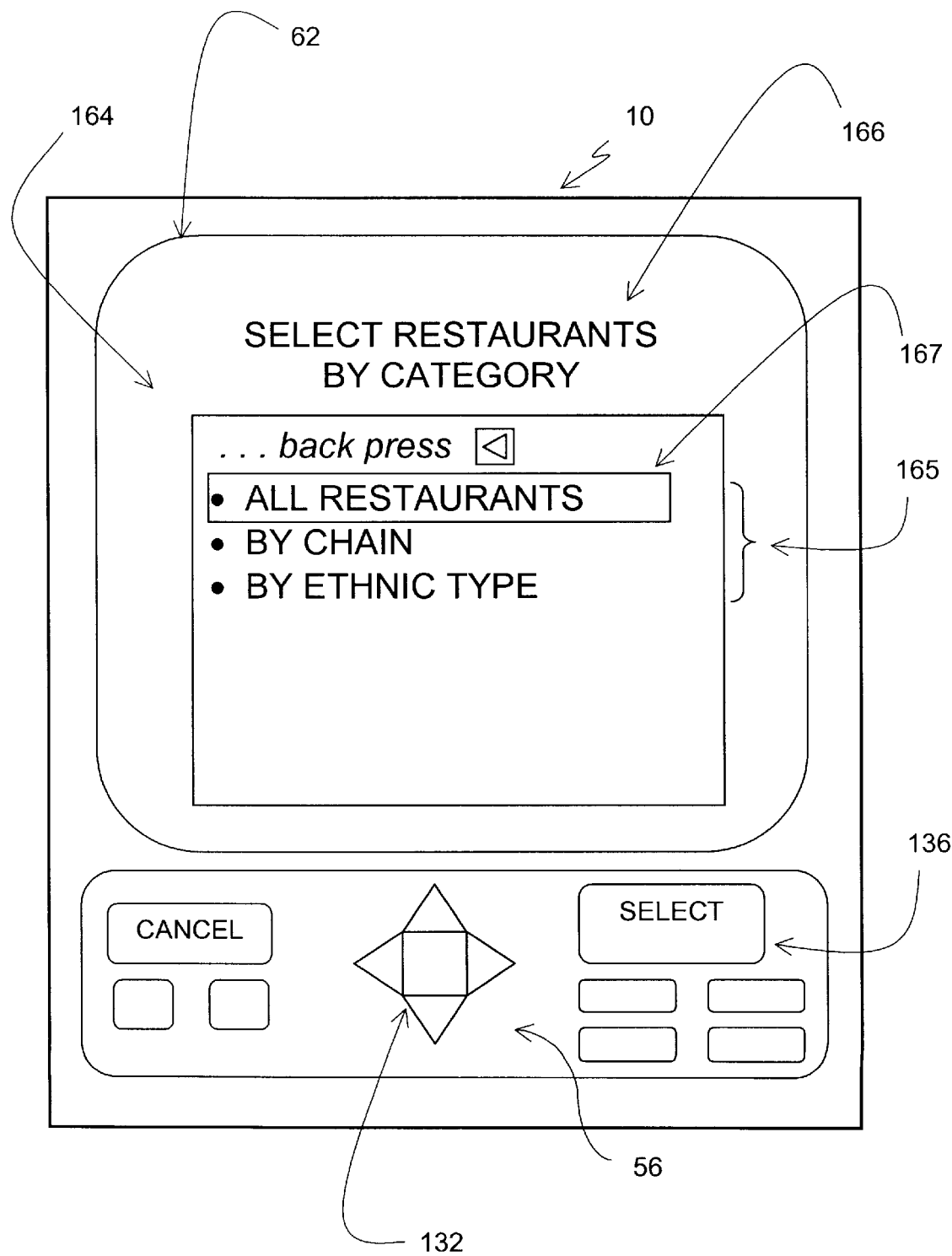

When the user selects one of the categories of points of interest, a menu screen like the one on FIG. 7 is presented. In FIG. 7, a menu 164 on the display 62 provides a plurality of different alternative ways 165 that the category of points of interest selected by the user can be searched. For the selected category, the user can search for all points of interest of the selected type or alternatively, the user can limit the search to those points of interest by chain or by another sub-category. The user is prompted by a message 166 to choose one of the ways to search. One of the ways is highlighted with an outlining box 167 and the user can select this way by pressing the "SELECT" key 136.

Figure 8:
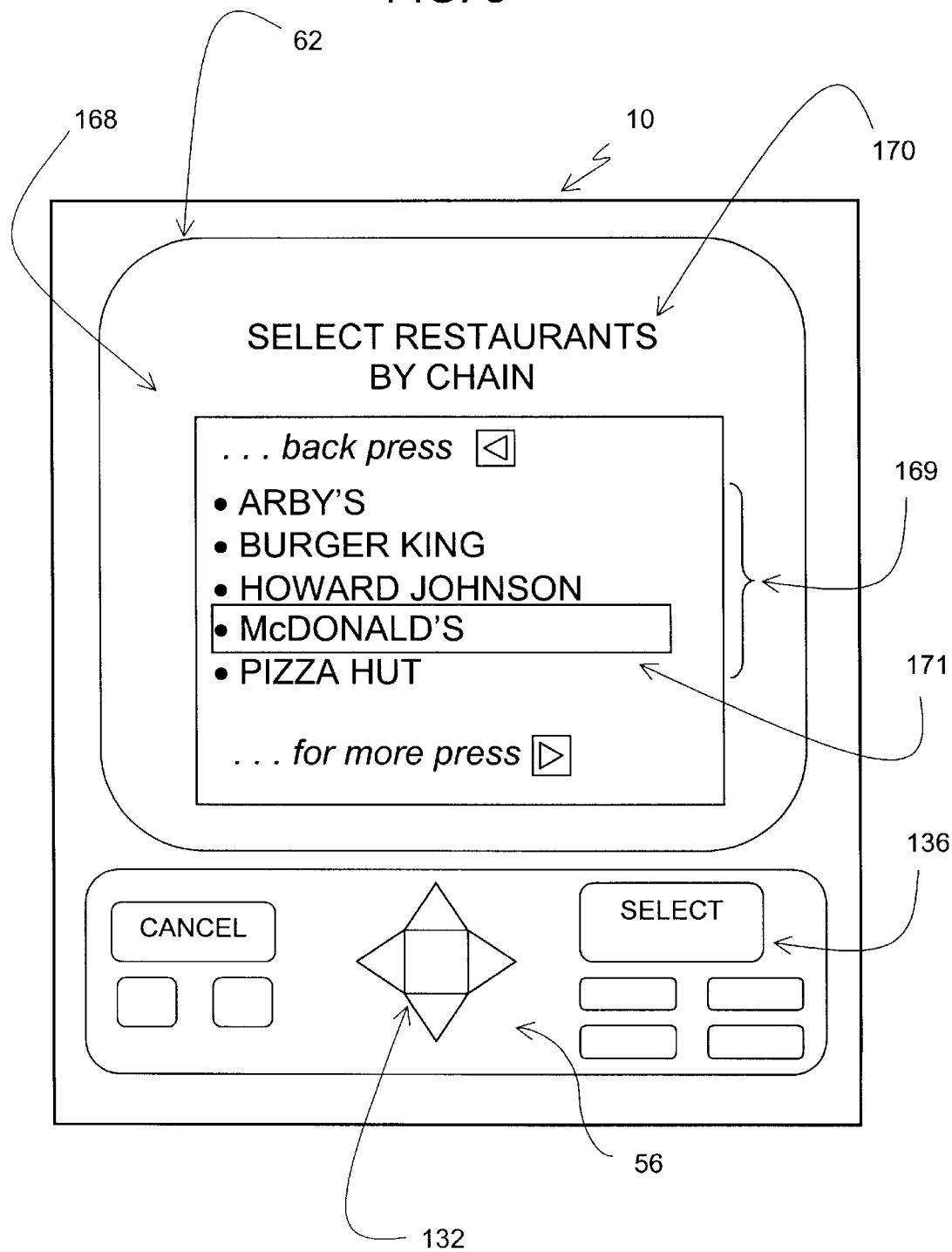

If the user chooses the alternative way "BY CHAIN" from the alternative ways 165 listed in the menu 164 of FIG. 7, a menu screen like the one on FIG. 8 is presented. In FIG. 8, a menu 168 on the display 62 provides a plurality of different chains of the selected type of point of interest. In this case, the selected type of points of interest is "RESTAURANTS" and therefore different restaurant chains 169 are listed. (If the selected category of points of interest were "GAS STATIONS", different gas station chains would be listed.) A message 170 prompts the user to choose one of the chains. One of the chains is highlighted with an outlining box 171 and the user can select this chain by pressing the "SELECT" key 136.

Figure 9:
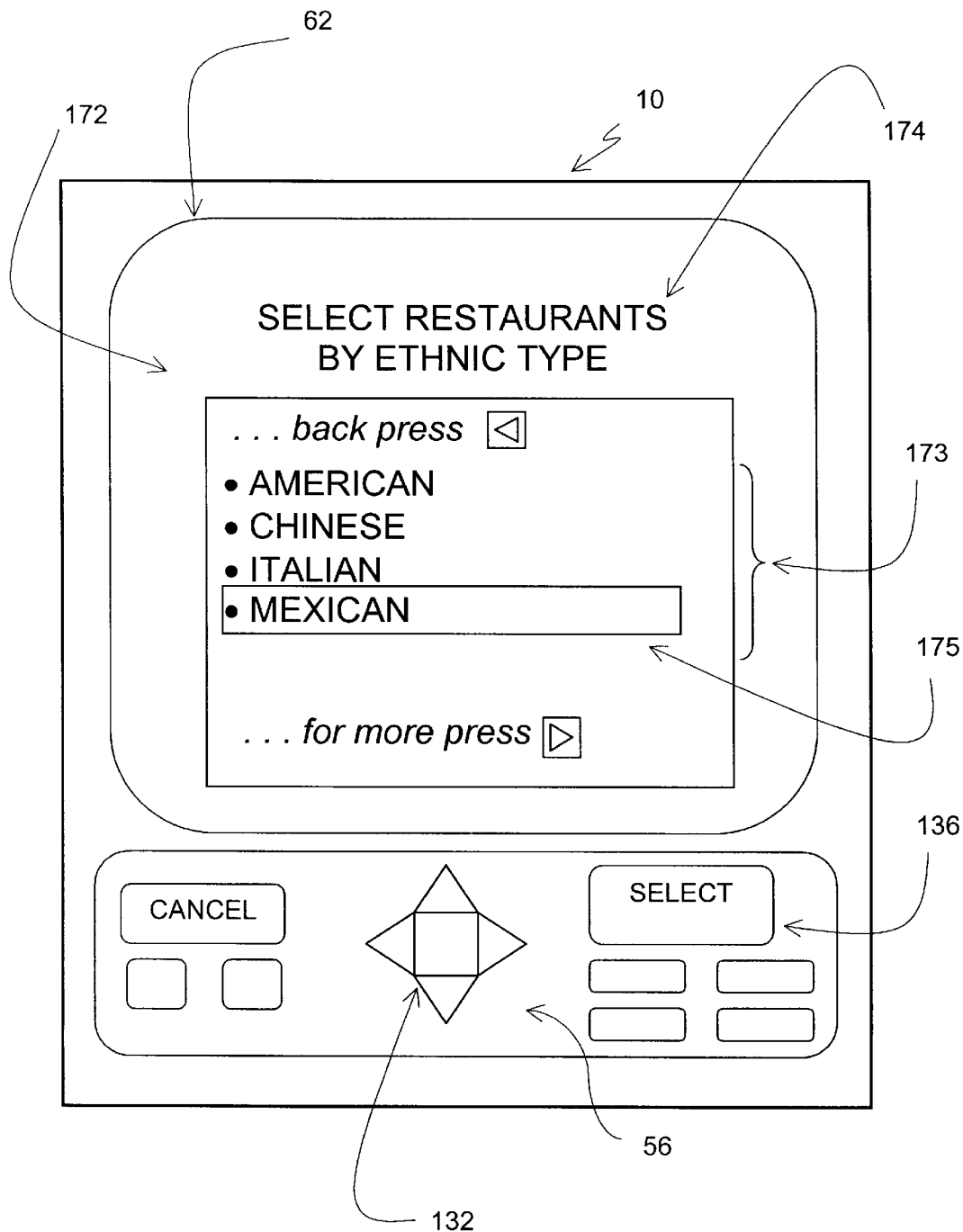

Referring again to FIG. 7, if the user chooses the alternative way "BY ETHNIC TYPE", a menu screen like the one in FIG. 9 is presented. In FIG. 9, a menu 172 on the display 62 provides a plurality 173 of different ethnic types of restaurants. A message 174 prompts the user to choose one of the chains. One of the ethnic types is highlighted with an outlining box 175 and the user can select this ethnic type by pressing the "SELECT" key 136.

After the user specifies the type of point of interest and any chains or other sub-categories, the intermediate stop routine 102, performs a search of the data in the geographic database 34. The search attempts to find one or more points of interest of the selected type (and of the selected chain or of the selected sub-category type, if applicable) at which an intermediate stop can be made while on route to the existing final destination. Because these points of interest should be along the way to the final destination, the search is limited to a geographic area defined relative to the current vehicle location and the destination. The intermediate search routine 102 may use various shapes of areas in which to search for points of interest of the selected type. FIGS. 10–14 show several different search area shapes.

Figure 10:
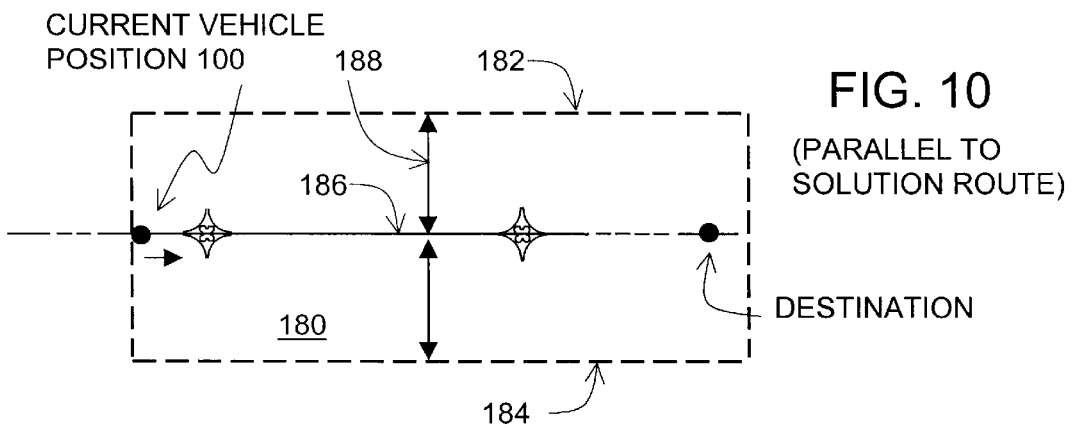
FIGS. 10–14 are illustrations of alternative search geometry patterns used with the first embodiment of the route guidance feature that provides route guidance for intermediate stops.

FIG. 10 shows a parallel boundary search area 180. In FIG. 7, the area 180 is defined between two boundaries, 182 and 184. These boundaries 182 and 184 are parallel to the path 186 of the solution route and located at a distance 188 to the right and left of the path 186 of the solution route. The search area 180 extends between the current location 100 of the vehicle and the destination. The distance 188 by which the boundaries 182 and 184 are located from the path 186 of the solution route is configurable. The distance 188 may also be made a function of one or more factors, such as the speed of the vehicle, the vehicle heading, the speed limits of the road segments in the solution route, the class or classes of roads in the solution route, and so on. In FIG. 10, the path 186 of the solution route and the boundaries 182 and 184 are shown as straight lines. Of course, the path of the solution route may not always be a straight line. If the path of the solution route is not a straight line, the shape of the boundaries may correspond to the shape of the path of the solution route. Alternatively, even if the path of the solution route 186 is not a straight line, the boundaries may be straight lines that are parallel to a straight line approximation of the general path of the solution route.

Figure 11:
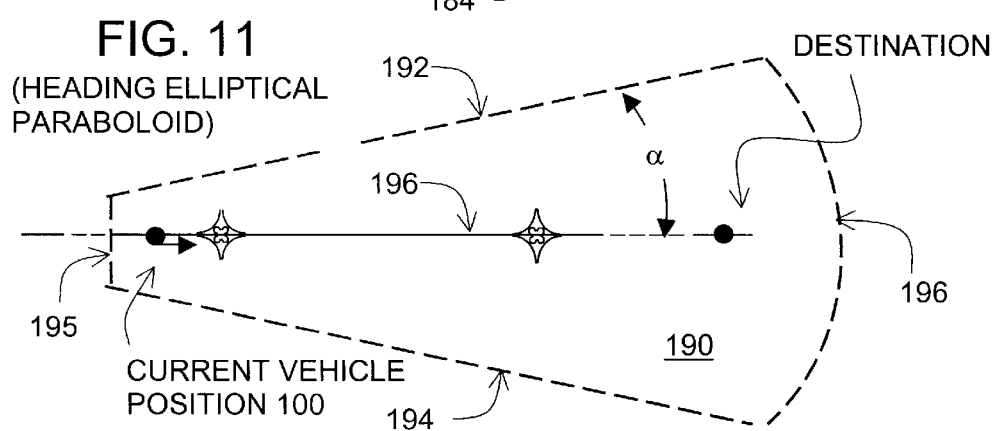

FIG. 11 shows a heading elliptical paraboloid search area 190. In FIG. 11, the boundaries 192 and 194 of the search area 190 diverge at an angle α from the path 196 of the solution route. The angle α by which the boundaries 192 and 194 diverge from the path 196 of the solution route distance may be configurable. The angle α may also be made a function of one or more factors, such as the vehicle heading, the speed of the vehicle, the speed limits of the road segments in the solution route, the class or classes of roads in the solution route, and so on. The search area 190 extends from a relatively small end 195 near the vehicle position 100 to a parabolic-shaped end 196 around the destination.

Figure 12:
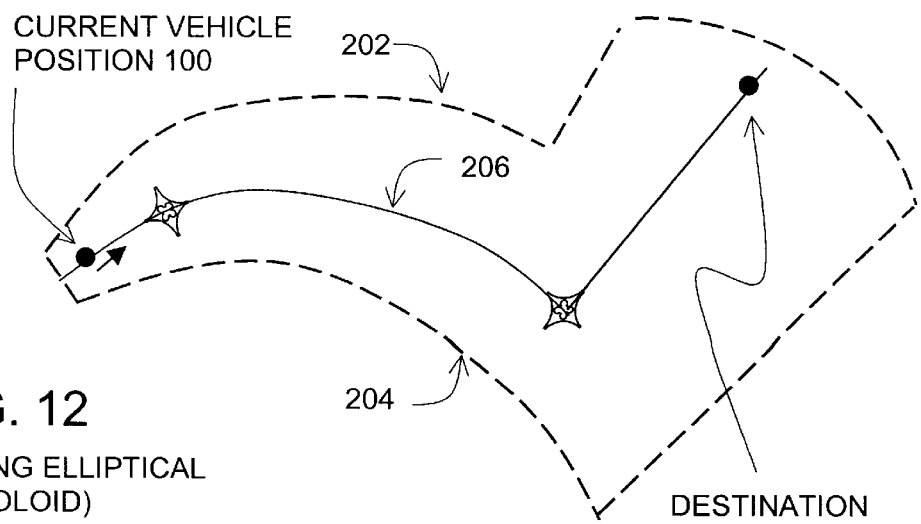

FIG. 12 shows another example of a heading elliptical paraboloid search area. FIG. 12 shows a case in which the path 206 of the solution route is not a straight line. If the path 206 of the solution route is not a straight line, the boundaries 202 and 204 may follow the path of the solution route 206, as shown in FIG. 12. Alternatively, the boundaries 202 and 204 may be straight lines that diverge from a straight line approximation of the path of the solution route.

Figure 13:
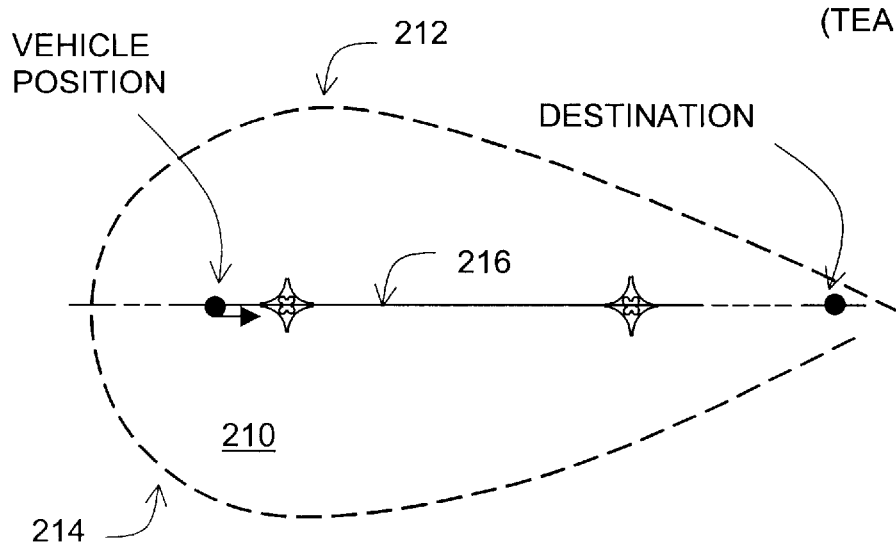

FIG. 13 shows a teardrop shaped search area 210 defined between two boundaries, 212 and 214. These boundaries 212 and 214 form a teardrop shape that is narrow around the destination and circular around the current vehicle position 100. The distance by which the boundaries 212 and 214 are located from the path 216 of the solution route and the angle of the teardrop shape may be configurable and may be a function of one or more factors, such as the heading of the vehicle, the speed of the vehicle, the speed limits of the road segments in the solution route, the class or classes of roads in the solution route, and so on. If the path 216 of the solution route is not a straight line, the boundaries 212 and 214 may correspond to the shape of the path of the solution route. Alternatively, the boundaries 212 and 214 may follow a straight line approximation of the path of the solution route.

Figure 14:
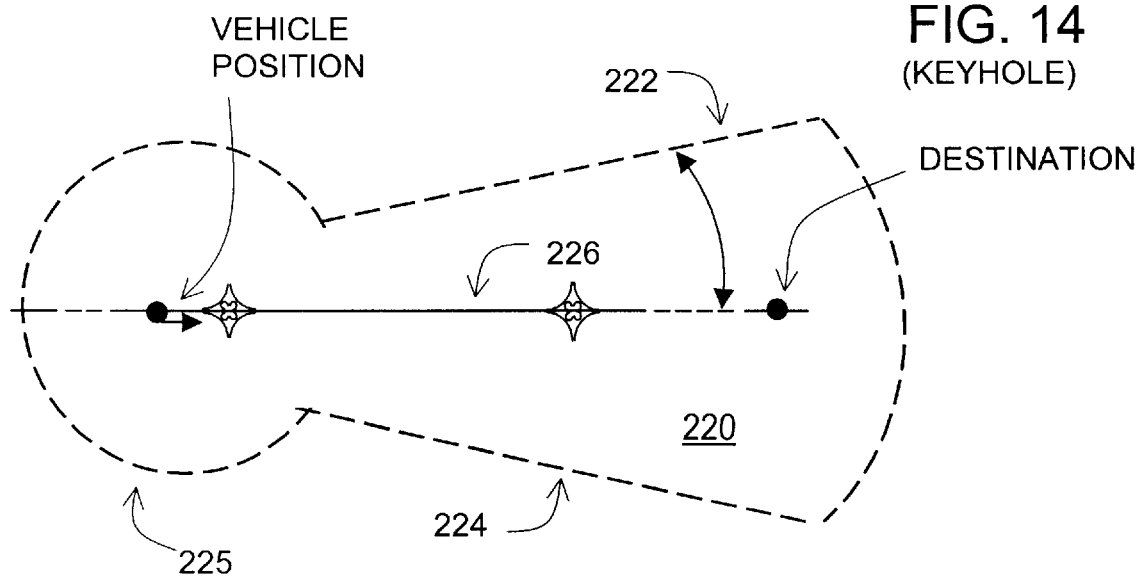

FIG. 14 shows a keyhole-shaped search area 220 defined between two boundaries, 222 and 224. These boundaries 222 and 224 diverge at an angle from a circular area 225 located around the current vehicle position 100. The angle by which the boundaries 222 and 224 diverge from the path 226 of the solution route and the size of the circular area 225 may be configurable or may be a function of one or more factors, such as the heading of the vehicle, the speed of the vehicle, the speed limits of the road segments in the solution route, the class or classes of roads in the solution route, and so on. If the path of the solution route is not a straight line, the boundaries and may correspond to the shape of the path of the solution route or may follow a straight line approximation of the path of the solution route.

Any of the search areas described above may be used by the intermediate stop routine 102 to define an area in which to search for points of interest of the type specified by the user. Other shapes of search areas may also be used. Using a search area, such as any of those shown in FIGS. 10–14, limits the number of points of interest to be evaluated. Regardless of the shape of search area used, the intermediate stop search routine attempts to find one or more points of interest of the type specified by the user located within the search area.

If no points of interest of the specified type are found in the search area, the intermediate stop routine 102 reports to the user that no points of interest of the specified type are located along the way to the destination.

If only one point of interest of the specified type is found in the search area used by the intermediate stop search routine, a new solution route is calculated from the current vehicle location to the destination by way of an intermediate stop at the point of interest. Information about the one point of interest may be communicated to the user in the manner described in connection with FIGS. 15 and 16 below.

If more than one point of interest of the specified type is found in the search area, the intermediate stop search routine identifies the one point of interest a detour to which defers arrival at the final destination the least. In other words, the intermediate stop routine 102 identifies the "best" one of the points of interest to the user, wherein a new solution route to the final destination that makes an intermediate stop at the "best" point of interest provides a sooner arrival time at the final destination than any other solution route that makes an intermediate stop at any of the other points of interest. The "best" point of interest may not necessarily be the point of interest that is closest to the solution route. This is illustrated in connection with FIG. 3.

Referring again to FIG. 3, assume that the intermediate stop routine 102 found three points of interest of the type specified by the user in the search area. These three points of interest are labeled, POI(1), POI(2), and POI(3). (Although only three points of interest of the specified type are shown in FIG. 3 it should be understood that the intermediate stop routine may have found more than three points of interest of the specified type.) Each of the three points of interest is located a different distance from the path of the solution route. The point of interest POI(1) is located closest to the path of the solution route, the point of interest POI(2) is located next closest to the path of the solution route, and the point of interest POI(1) is located farthest from the path of the solution route. Even though the point of interest POI(3) is located farther from the path of the solution route than the other points of interest, POI(1) and POI(2), it may take less time to make a detour that includes an intermediate stop at the point of interest POI(3) than either the point of interest POI(1) or the point of interest POI(2). As shown in FIG. 3, the point of interest POI(3) is located along a road segment G which is accessible from another road segment F via an interchange INT(3). The road segment F is accessible from the path of the solution route at the interchange INT(2). For purposes of this example, the road segments F and G are controlled access roads with relatively high speed limits.

By comparison, the point of interest POI(1) is at a location which is accessible by a series of lower ranked roads 230. In order to reach the point of interest POI(1), the vehicle would have to follow a detour that travels along the segment H to the intersection at 232 and then travel along the lower ranked roads 230 to reach POI(1). Similarly, the point of interest POI(2) is at another location which is accessible by another series of lower ranked roads 233. In order to reach the point of interest POI(2), the vehicle would have to follow a detour that travels along the segment J to the intersection at 234 and then travel along the lower ranked roads 233 to reach POI(2).

The intermediate stop search routine 102 may calculate potential new solution routes for each of the points of interest of the specified type found in the search area and then compare the potential solution routes in order to find the one that arrives at the final destination in the least time. The intermediate stop search routine 102 may use functions included in the route calculation application 75 for this purpose. The intermediate stop routine 102 attempts to find the route that takes the least amount of time to reach the final destination while making an intermediate stop at a point of interest of the selected type. When evaluating the amount of time to travel from to the final destination, the intermediate stop routine 102 accounts for both the amount of time it takes to reach the intermediate stop from the current vehicle position and the amount of time it takes to reach the final destination from the location of the intermediate stop. When determining a route to an intermediate stop, the intermediate stop routine evaluates routes to the final destination that retrace detour routes back to the original solution route, as well as routes that reach the final destination without retracing detour routes.

When evaluating each point of interest, the intermediate stop routine 102 may perform only enough analysis on each potential new solution route for each identified point of interest of the specified type to confirm that one of them is the best.

After the intermediate stop routine 102 finds the one point of interest of the specified type that adds the least time to a new solution route to the destination, the one point of interest is reported to the user. There are several ways that the navigation system may report to the user the one point of interest that adds the least time to a new solution route to the destination. Two ways are shown in FIGS. 15 and 16.

Figure 15:
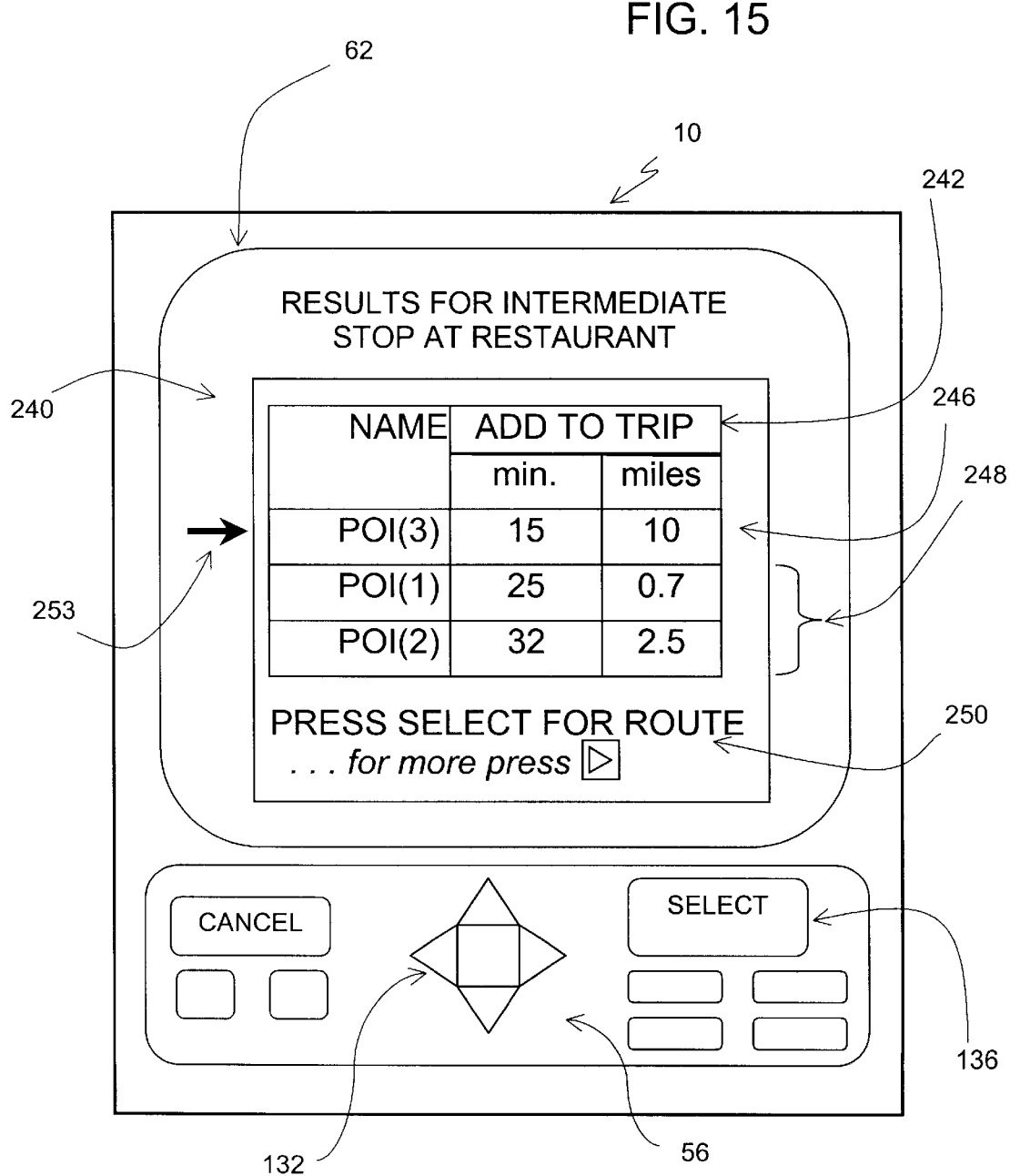
FIG. 15 shows the display of the navigation system of FIG. 1 with results of the route guidance feature for determining intermediate stops.
Figure 16:
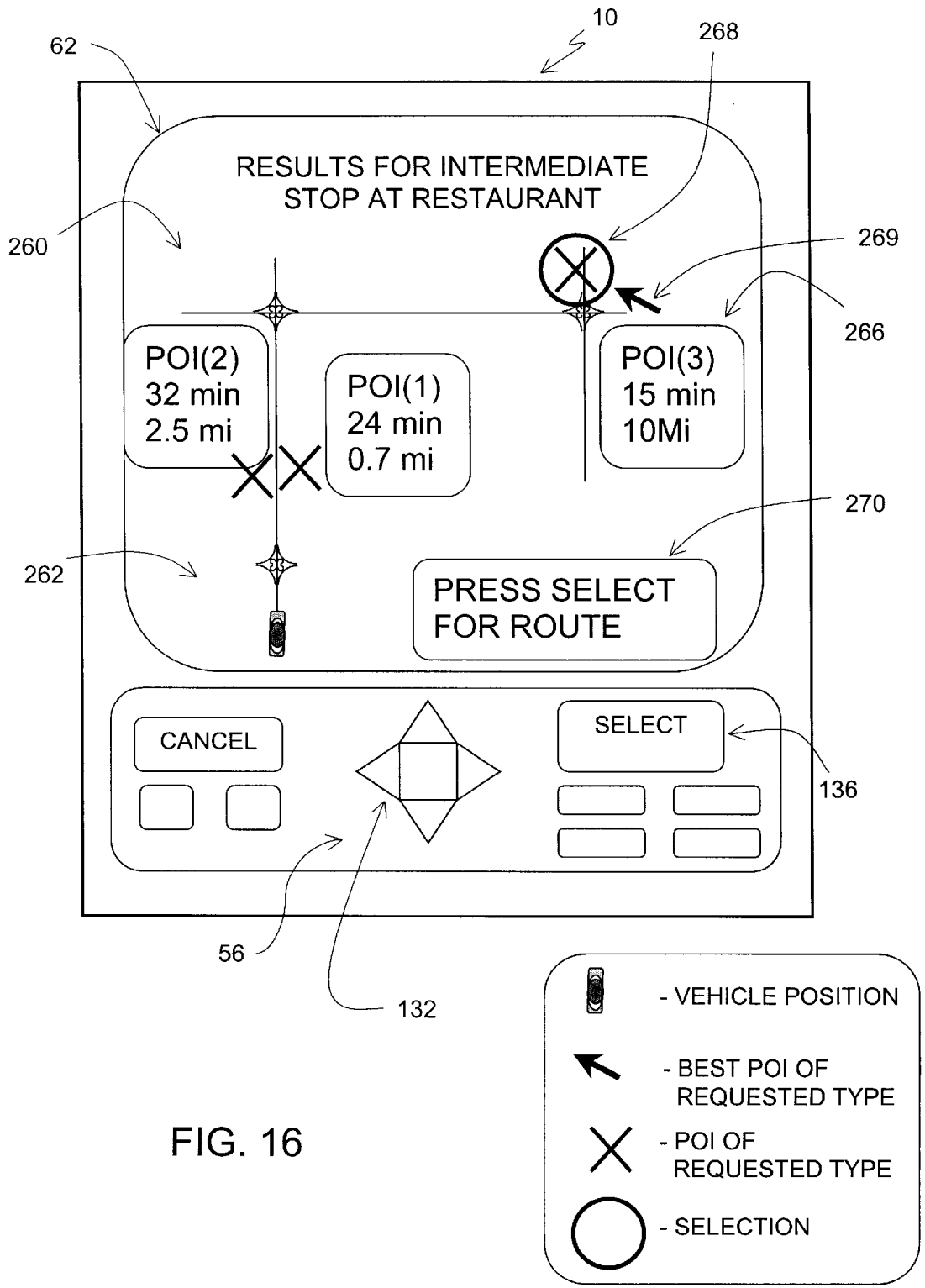
FIG. 16 shows an alternative embodiment of the display of the navigation system of FIG. 1 with results of the route guidance feature for determining intermediate stops.

FIG. 15 shows the display 62 of the navigation system. The display 62 contains the results 240 of the user's request for finding an intermediate stop of a specified type, described above in connection with FIGS. 4–9. In the embodiment of FIG. 15, the results 240 are presented as text. More specifically, the results 240 are presented as text in a table 242. A first entry 246 in the table 242 identifies the point of interest of the specified type by name. The first entry 246 may include an estimation of the amount of time that would be added to the trip to the destination if a new solution route is followed that makes an intermediate stop at the point of interest named in the first entry 246. The first entry 246 may also indicate the distance that would be added to the trip to the destination if a new solution route were followed that makes an intermediate stop at the point of interest named in the first entry 246.

In the embodiment of FIG. 15, the intermediate stop routine 102 also identifies to the user one or more additional points of interest of the specified type. These additional points of interest are included as additional entries 248 in the table 242. The estimated additional times and distances associated with each of these additional points of interest may be included in the table 242 so that the user can easily compare the points of interest to each other. For example, if the points of interest are restaurants, the user may prefer a particular restaurant even if making an intermediate stop at the preferred restaurant would add more time.

When the intermediate stop routine 102 presents the user with a plurality of points of interest of the specified type, it may present them in the table 242 ranked in order. The point of interest that adds the least time to a route to the destination is presented first, followed by the point of interest of the specified type that adds the next least amount of time to a route to the destination, and so on.

Included with the results 240 on the display 62 is a message 250 that instructs the user to select one of the entries in the table 242. The user can operate the toggle 132 to move an indication 253 (such as an arrow) that points to or otherwise highlights one of the entries in order to indicate a desired selection. When the desired entry is indicated, the user makes the selection by pressing the "SELECT" key 136.

FIG. 16 shows another way that the intermediate stop routine 102 can present the results of the search for intermediate stops to the user. In FIG. 16, the display 62 contains the results 260 of the user's request for finding an intermediate stop of a specified type, described above in connection with FIGS. 4–9. In the embodiment of FIG. 16, the results 260 are presented graphically as a map 262. One or more of the points of interest of the specified type identified by the intermediate stop routine 102 are indicated on the map 262. At least the one point of interest at which an intermediate stop can be made that adds the least amount of time to a new solution route to the destination is shown on the map 262. One or more additional points of interest of the specified type may also be shown on the map 262. The points of interest are shown on the map 262 at their respective positions. Each point of interest shown on the map 262 may be associated with text 266 that identifies the point of interest by name. Each point of interest may also be associated with text that includes an estimation of the amount of time that would be added to the route to the destination if a new solution route is followed that makes an intermediate stop at the associated point of interest. Each point of interest may also be associated with text that includes the distance that would be added to the trip to the final destination if a new solution route were followed that makes an intermediate stop at the associated point of interest.

When more than one point of interest of the specified type is shown on the map 262, an indication is presented that points out the one point of interest that adds the least time to a route to the destination. The indication may be an arrow 269.

Included with the results 260 on the display 62 is a message 270 that instructs the user to select one of the points of interest shown on the map 262. The user can operate the toggle 132 to move an indication, such as a circle 268 that highlights one of the points of interest, in order to indicate a desired selection. When the desired point of interest is indicated, the user chooses the selection by pressing the "SELECT" key 136.

As shown above in connection with FIGS. 15 and 16, the navigation system and/or the intermediate stop routine 102 may use different ways to communicate to the user the results of the search for intermediate stops of the type specified by the user. More than one way may be used. For example, the user may be able to toggle between the results screen 240 shown in FIG. 15 and the results screen 260 shown in FIG. 16. There may be ways in addition to those shown in FIGS. 15 and 16 by which the requested information may be reported to the user. For example, the requested information may be communicated audibly.

Regardless of the way by which the information about intermediate stops is communicated to the user, the user is requested to make a selection of one of the points of interest. When the user makes a selection, the navigation system then provides the user with guidance to an intermediate stop at the selected point of interest. After the intermediate stop is made, the navigation system then provides the user with guidance for traveling from the intermediate stop to the destination. At any time while traveling to the intermediate stop or from the intermediate stop to the destination, the user may operate the intermediate stop routine 102, in the manner described above, to request information about another intermediate stop. This new intermediate stop may be of the same type as the first intermediate stop or may be of a different type.

B. Intermediate Stops with Time Constraints

According to another embodiment, the user may specify a time constraint when requesting information from the navigation system about making an intermediate stop at a point of interest of a particular type. This feature may be used when the user wants to make an intermediate stop while on route to a final destination and wants the intermediate stop to be made at a particular time during the trip to the final destination. For example, consider the situation in which the user is traveling along a route to a destination and the expected time of arrival at the destination is in 3.5 hours. Suppose the user wants to make an intermediate stop at a restaurant, but wants the intermediate stop to be made within the next 30 minutes. According to this embodiment, an intermediate stop routine in the navigation system can find an intermediate stop of the specified type (i.e., restaurants) that defers arrival at the destination by the least amount of time and that makes the intermediate stop at the restaurant within the next 30 minutes.

Figure 17:
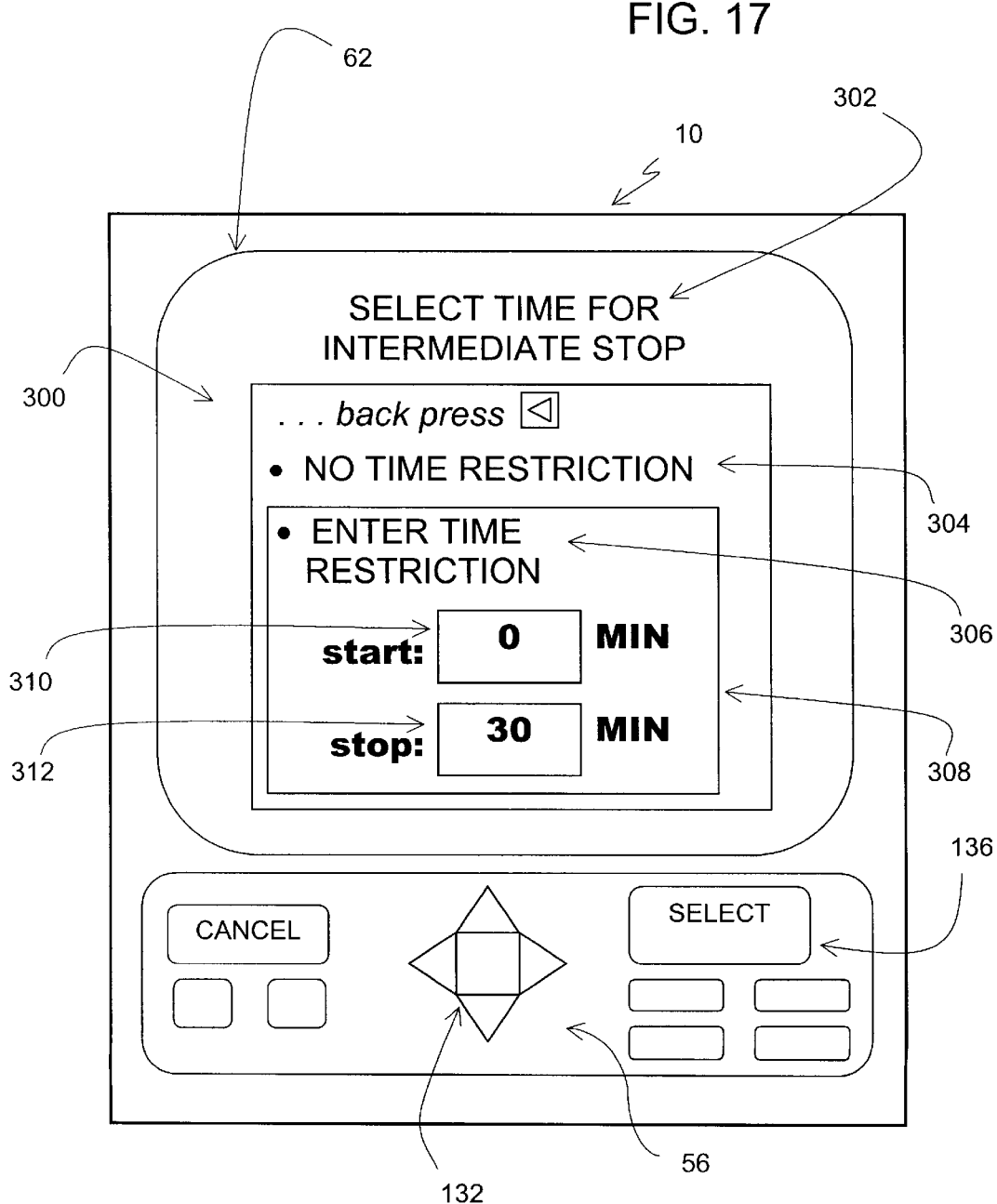
FIG. 17 shows a menu on the display of the navigation system of FIG. 1 for providing an alternative feature for determining an intermediate stop.

An intermediate stop routine similar to the one described in the first embodiment can be used for this alternative embodiment. In order to provide the additional function of constraining the intermediate stop to a specified period of time, the intermediate stop routine obtains additional input from the user. The additional input can be obtained with a data input screen 300 like the one shown on the display 62 in FIG. 17. The input screen may be presented to the user after the user selects a category (and optionally a chain or another category, such as ethnic type) using the menus shown in FIGS. 6–9. In FIG. 17, a message 302 on the screen 300 requests the user to make a selection. Two selections are available on the screen 300. One selection 304 allows the user to have the navigation system search for points of interest of the selected type without a time restriction. If the user chooses the first selection 304, the intermediate stop routine 102 operates in the manner described above in connection with the first embodiment. The other selection 306 allows the user to constrain the search for points of interest of the specified type to a specified time period. A highlighting box 308 can be moved from one selection to the other by appropriate manipulation of the controls 132 on the input panel 56 of the user interface. In FIG. 17, the highlighting box 308 is shown around the selection 306.

When the user chooses the selection 306 that allows a time period to be specified for the intermediate stop, the user is then required to enter data that define the time period. A time period is specified by indicating a start time and a stop time. Data entry fields 310 and 312 on the screen 300 may be used for this purpose. In the embodiment of FIG. 17, the start and stop times are set relative to the current time. For example, the current time is "0" and a time three hours from the current time is "3 hrs." or "360 min". By default the navigation system may set the time in the start time data entry field 310 to "0" (e.g., the current time) and the time in the stop time entry field 312 to the estimated remaining travel time for following the original route to the final destination. The user may then use the keys or toggle 132 on the input panel 56 to adjust the entries in the start and stop data entry fields, 310 and 312. For example, if the user wants to constrain the time period for the intermediate stop to within the next 30 minutes of the current time, the start time would be left at "0" and the stop time would be adjusted down to "30 min", as shown in FIG. 17. In alternative embodiments, other types of input screens may be used. For example, actual times may be used instead of relative times.

When the start and stop times have been specified by the user, the intermediate stop routine 102 constrains the search for potential points of interest for intermediate stops by adjusting the size of the search area. Examples of this process are illustrated in FIGS. 18 and 19. FIG. 18 shows a search area 400 located along the path 406 of a solution route to a destination from a current vehicle position 100. The search area 400 is defined to have the heading paraboloid shape, as described above. The search area 400 is located between boundaries 402 and 404 and extends from approximately the current vehicle position 100 to a distal boundary 409. The distal boundary 409 is located at the maximum distance that the vehicle could travel within the next 30 minutes. In a preferred embodiment, this maximum distance takes into account the speed limits of the roads along the solution route. As shown in FIG. 18, the search area 400 does not include the destination because the destination cannot be reached within the time period constraint for the intermediate stop.

FIG. 19 shows another example of how the intermediate stop routine 102 can adjust the size of the search area to allow the user to specify a time for an intermediate stop. FIG. 19 shows another search area 420 between boundaries 422 and 424. The search area 420 extends from approximately the current vehicle position to a distal boundary 429, which is located at the limit of the distance that the vehicle can travel during the specified time period.

After the intermediate stop routine 102 adjusts the size of the search area, a search for points of interest of the specified type is conducted. The search is limited to only those points of interest of the specified type that are located in the search area. After these points of interests are identified, the intermediate stop routine evaluates them to identify the one that defers arrival at the final destination the least. This "best" point of interest is identified to the user, as described above. The intermediate stop routine 102 may also identify additional points of interest of the specified type.

Before identifying points of interest to the user as potential locations for making an intermediate stop, the intermediate stop routine 102 checks whether an intermediate stop can be made at the point of interest within the time constraint set by the user. Even if a point of interest is located within the search area, it is not necessarily accessible within the specified time period. For example, a point of interest located along a high speed road may be accessible within the specified time period, but a point of interest that can be reached only by low speed roads may not be accessible.

C. Intermediate Stops with Quick On and Off Constraints

According to another embodiment, a user traveling along a controlled access road may specify that an intermediate stop be located close to an interchange at which the driver can quickly get back on the controlled access road. The user may prefer this kind of intermediate stop because it avoids travelling for a substantial distance off controlled access roads. Some users may prefer traveling on controlled access roads for safety reasons and other considerations.

An intermediate stop routine similar to those described above can be used for this alternative embodiment. The user may choose this kind of search by selecting an item on a menu presented on the user interface for this purpose.

When the user selects this type of search, the intermediate stop routine operates in a manner that limits the search for the points of interest of the selected type to areas close to interchanges along the controlled access road at which the controlled access road can be re-entered. FIG. 20 shows one example of the manner in which the intermediate stop routine operates to search for points of interest according to this embodiment.

In FIG. 20, the vehicle is traveling along a solution route 441 toward a destination. The solution route 441 is comprised of road segments that are controlled access roads (e.g., expressways). Along the solution route 441 are interchanges 442, 443, 444, and 445. At each of these interchanges 442, 443, 444, and 445 is an exit ramp that can be used by a vehicle traveling toward the destination to exit from the controlled access road. At the interchanges 442, 443, and 445 are entrance ramps that can be used to re-enter the controlled access road. However, at the interchange 444, there is no entrance ramp back onto the controlled access road.

When the intermediate stop routine searches for intermediate stops of the selected type, it forms search areas around the interchanges that have both exit ramps and entrance ramps. Specifically, the intermediate stop routine forms search areas 450A, 450B, and 450C around the interchanges 442, 443, and 445, respectively. No search area is formed around the interchange 444 because the interchange does not include an entrance ramp from which the controlled access road can be re-entered. The intermediate stop routine searches for points of interest of the selected within the search areas. Points of interest outside the search areas are not considered. Thus, if a point of interest of the selected type were located immediately adjacent to the intersection 444, it would not be considered.

D. Facilitating Identification of Accessible Points of Interest

In the embodiments described above, it was described how the intermediate stop routine searched for points of interest of a user-specified type at which intermediate stops could be made while on route to a final destination. These points of interest can be found by route calculation search techniques, included in the route calculation application 75, that are used to find routes between two points in a geographic area.

Figure 21:
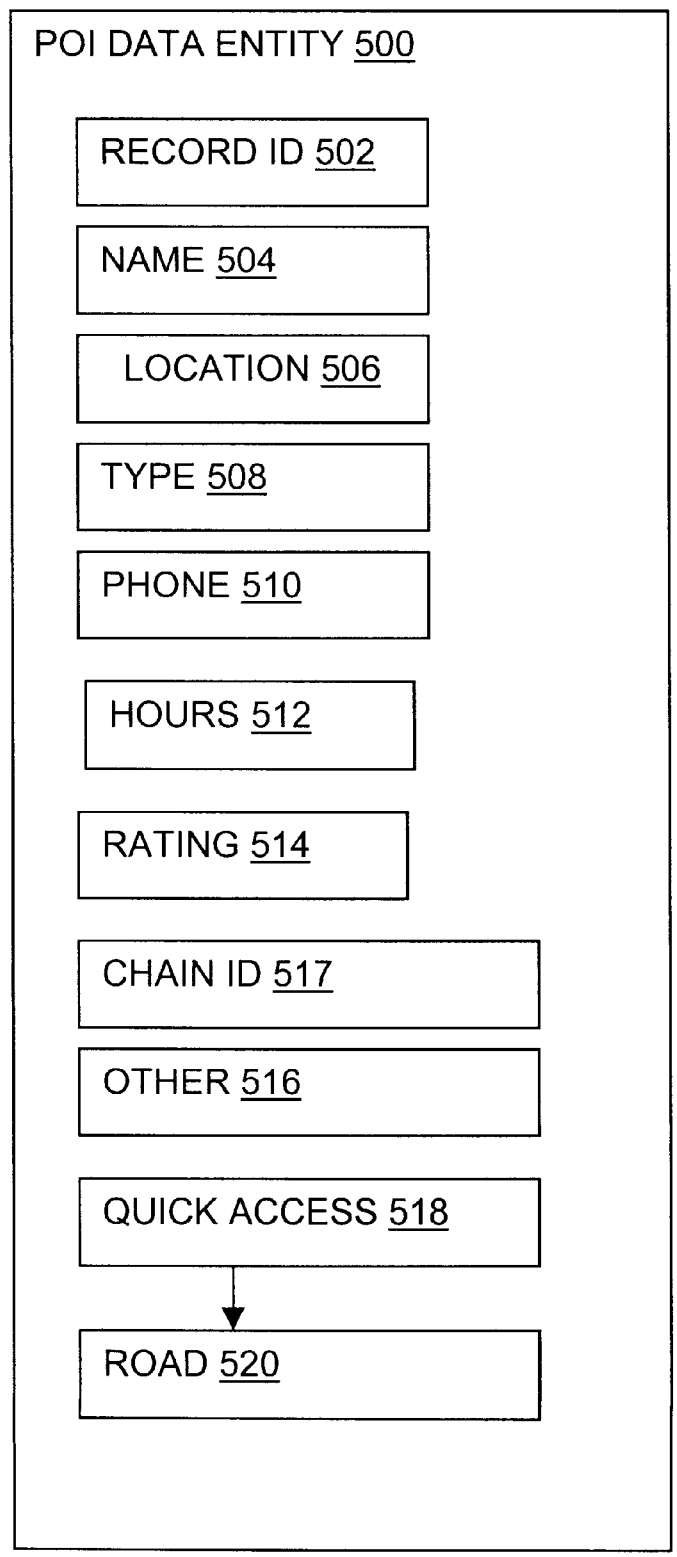
FIG. 21 is a block diagram showing components of a point of interest data record according to an alternative embodiment.

It is possible that some of these points of interest could be identified more quickly by including additional data in the geographic database used by the navigation system. According to one embodiment, the geographic database includes data records for the points of interest located in the geographic area. Associated with each point of interest data record is a name, location, and type, as well as additional information about a point of interest. The name of the point of interest is the name of the establishment. The location of the point of interest can be the geographic coordinates of the point of interest or may be an identification of the road segment on which the point of interest is located. The point of interest type indicates what kind of point of interest the record represents, e.g., restaurant, movie theater, hotel, gas station, etc. Additional data associated with a point of interest may include a phone number of the point of interest, a chain ID (e.g., McDonald's, Amoco, Shell, etc.), hours of operation, a rating, etc. FIG. 21 illustrates these components of a point of interest data record 500 included in the geographic data 34 of FIG. 1.

One way to facilitate locating points of interest that can be reached quickly while on route to a final destination is to include data with point of interest records that indicate whether a represented point of interest is located at or close to both an exit ramp and an entrance ramp associated with a controlled access road. This type of data would be helpful for identifying points of interest around interchanges as described in connection with FIG. 20. This additional data can be included as an attribute (referred to as a "quick access attribute") of the point of interest record. The quick access attribute can be a single bit or can include an identification of the controlled access road from which the point of interest is accessible.

If point of interest records include this kind of additional information, the intermediate stop routine 102 can use this information to find accessible points of interest quickly. When a vehicle is on a controlled access road and the user wishes to find points of interest of a particular type for making an intermediate stop, the intermediate stop routine uses the quick access attribute associated with points of interest to identify those points of interest that are easily accessible from a controlled access road. The intermediate stop routine then evaluates first those points that are easily accessible from a controlled access road. By evaluating the records that represent these points of interest first, the intermediate stop routine may be able to find the best choices for an intermediate stop more quickly.

E. Other Embodiments

In the first embodiment described above, the one point of interest for an intermediate stop was identified that added the least amount of time to a new solution route to the destination. In alternative embodiments, intermediate stops can be identified that are optimized for other criteria. For example, instead of identifying the point of interest that adds the least amount of time to a route to a final destination, the intermediate stop routine can identify the one point of interest that adds the least traveling distance to a new solution route to the final destination. (Least traveling distance may be an important consideration if remaining fuel is a factor.) In another alternative, if the user prefers controlled access roads, the intermediate stop routine can identify the one point of interest that adds the least traveling distance not on controlled access roads. If the user prefers to avoid tolls, the intermediate stop routine can identify the one point of interest that adds the least tolls. The intermediate stop routine can be optimized for various other factors.

It is intended that the foregoing detailed description be regarded as illustrative rather than limiting and that it is understood that the following claims including all equivalents are intended to define the scope of the invention.

We claim:

1. A method of operation for a navigation system used in a vehicle comprising:

calculating a first route to a destination;

determining a current location of the vehicle while traveling along the first route to the destination, while traveling along the first route to the destination, accepting input from a vehicle driver, wherein said input indicates a type of point of interest at which to stop while traveling to the destination and a time period during which to stop;

selecting from a geographic database one location of the indicated type from a plurality of locations of the indicated type; and calculating a new route to the destination that includes an intermediate stop at the one location of the indicated type during the indicated time period, wherein the new route has a travel time to the destination that is less than routes to the destination that make intermediate stops at others of said plurality of locations of the indicated type.

2. The method of claim 1 further comprising:

determining all locations of the indicated type that are located around interchanges at which a controlled access road can be re-entered quickly.

3. The method of claim 1 wherein the indicated type includes one of: gas stations, hotels, museums, and restaurants.

4. The method of claim 1 further comprising:

providing the vehicle driver with guidance for following the new route while traveling to the destination.

5. The method of claim 1 wherein the new route has less distance on roads that are not controlled access roads than routes to the destination that make intermediate stops at others of said plurality of locations of the indicated type.

6. A method of operation for a navigation system used in a vehicle comprising:

calculating a first route to a destination; and determining a current location of the vehicle while traveling along the first route to the destination, while traveling along the first route to the destination, accepting input from a vehicle driver, wherein said input indicates a type of point of interest at which to stop while traveling to the destination and additional input that indicates a time period during which to stop at the point of interest of the indicated type;

selecting from a geographic database one location of the indicated type from a plurality of locations of the indicated type; and calculating a new route to the destination that includes an intermediate stop at the one location of the indicated type, wherein the new route has less distance on roads that are not controlled access roads than routes to the destination that make intermediate stops at others of said plurality of locations of the indicated type and further wherein the new route includes an intermediate stop at the one location of the indicated type during the indicated time period.

7. The method of claim 6 wherein the geographic database includes data indicating whether a represented point of interest is located in proximity to an interchange at which a controlled access road can be entered and exited.

8. The method of claim 6 wherein the indicated type comprises restaurants.

9. The method of claim 6 further comprising:

providing the vehicle driver with guidance for following the new route while traveling to the destination.

10. A method of operation for a navigation system, the method comprising the steps of:

accepting identification by a navigation system user of a business chain at which an intermediate stop is to be made on route to a final destination; and using a geographic database, determining one location of the business chain from a plurality of locations of the business chain, wherein a solution route to the final destination that includes an intermediate stop at the one location of the business chain has a travel time that is less than routes to the final destination that make intermediate stops at the others of said plurality of locations of the business chain.

11. The method of claim 10 wherein the geographic database includes data indicating a business chain to which a represented point of interest is associated.

12. The method of claim 10 further comprising:

accepting additional input from the navigation system user, wherein said additional input indicates a time period during which to make said intermediate stop, and wherein the solution route includes an intermediate stop at the one location of the business chain during the indicated time period.

13. The method of claim 10 wherein the geographic database includes data indicating whether a represented point of interest is located in proximity to an interchange at which a controlled access road can be entered and exited.

14. The method of claim 10 further comprising:

accepting additional input from the navigation system user, wherein said additional input indicates a point of interest type, and wherein the solution route includes an intermediate stop at the one location of the business chain and of the point of interest type.

15. A geographic database that contains data that represent geographic features in a region, the geographic database comprising:

data that represent points of interest, including data attributes that indicate what type of point of interest a represented point of interest is;

data attributes that indicate a location of a represented point of interest;

data attributes that indicate whether a represented point of interest is located by quick access to a controlled access road; and data attributes that indicate a business chain with which a represented point of interest is associated.

16. The geographic database of claim 15 wherein said data are stored on a computer-readable medium.

17. The geographic database of claim 15 wherein said data are stored on a computer-readable medium located in a navigation system.

18. The geographic database of claim 15 wherein said data are stored on a computer-readable medium located in a navigation system installed in a vehicle.

* * * * *